O. L. GIFFIN.
ROPE HOOK.
APPLICATION FILED JULY 24, 1920.
1,361,249.
Patented Dec. 7, 1920.
2 SHEETS—SHEET 1.
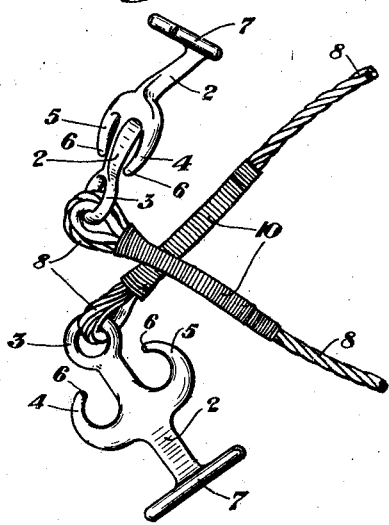
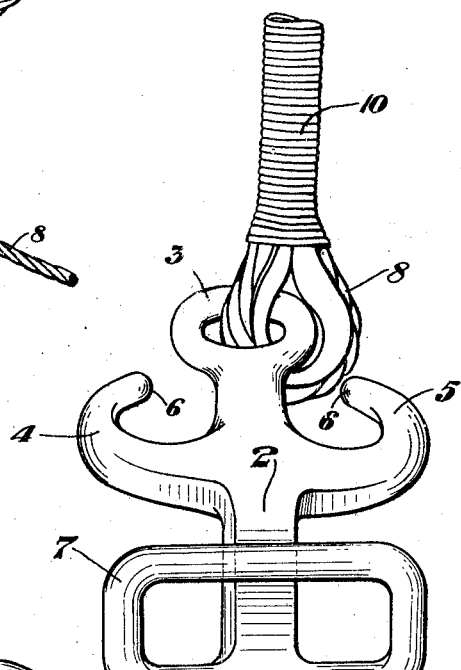
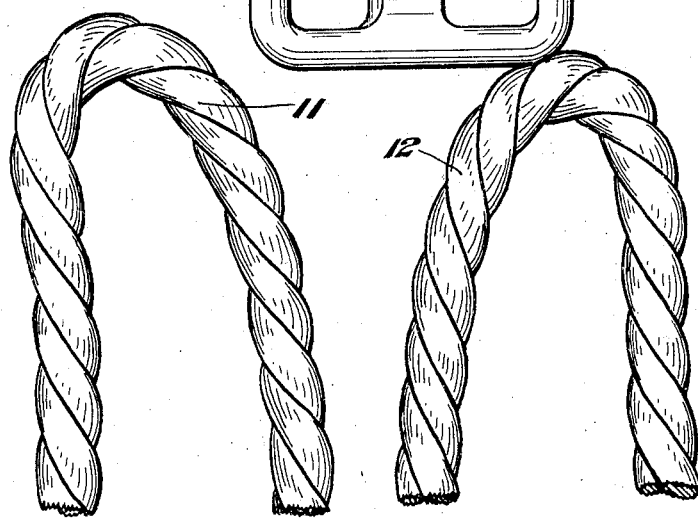

O. L. GIFFIN.
ROPE HOOK.
APPLICATION FILED JULY 24, 1920.
1,361,249.
Patented Dec. 7, 1920.
2 SHEETS—SHEET 2.
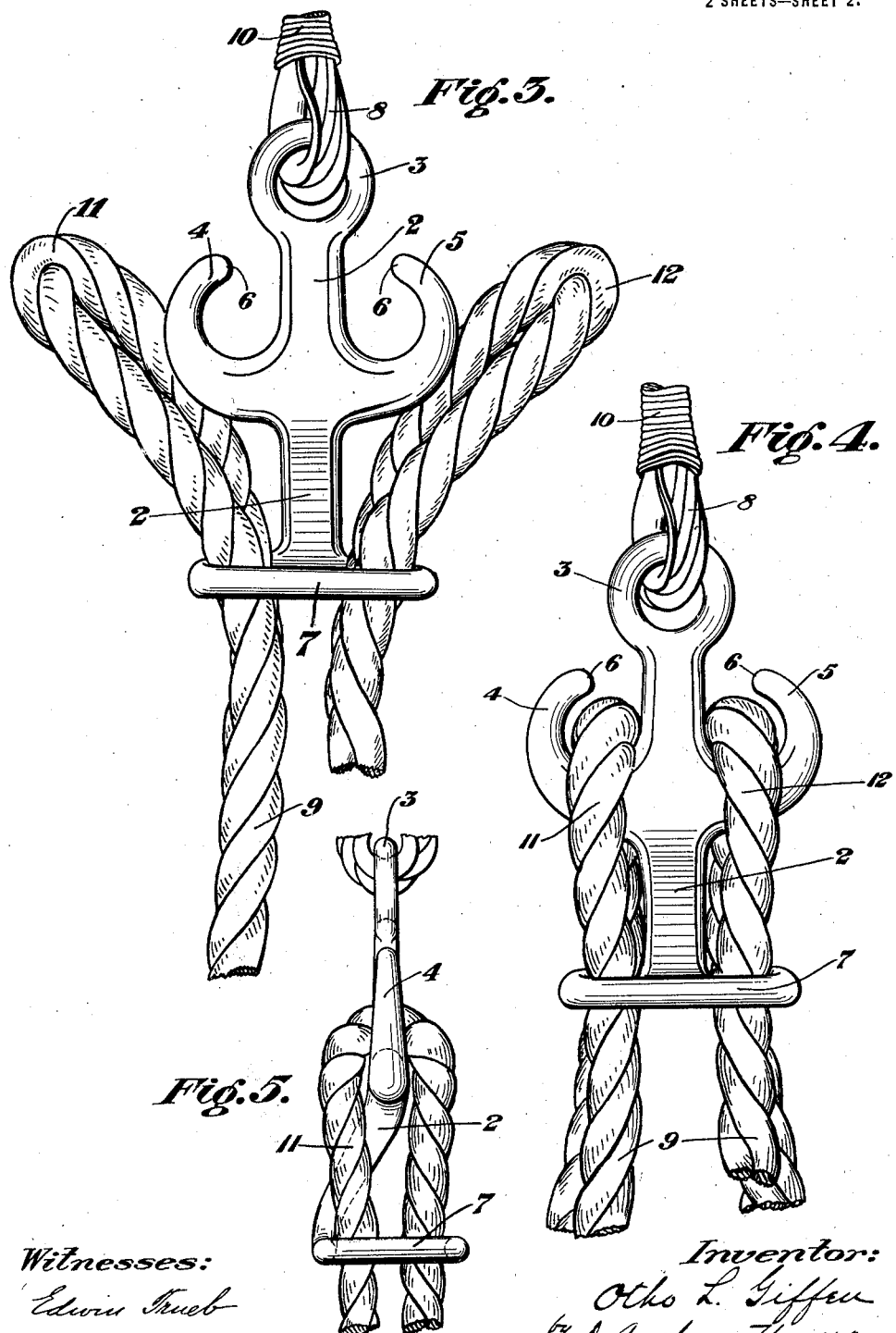

UNITED STATES PATENT OFFICE.

OTHO L. GIFFIN, OF WORCESTER, MASSACHUSETTS, ASSIGNOR TO THE AMERICAN STEEL AND WIRE COMPANY OF NEW JERSEY, A CORPORATION OF NEW JERSEY.

ROPE-HOOK.

1,361,249.

Specification of Letters Patent.

Patented Dec. 7, 1920.

Application filed July 24, 1920. Serial No. 398,833.

*To all whom it may concern:*

Be it known that I, OTHO L. GIFFIN, a citizen of the United States, and resident of Worcester, in the county of Worcester and State of Massachusetts, have invented certain new and useful Improvements in Rope-Hooks, of which the following is a specification.

This invention relates to rope hooks, and more particularly to rope hooks adapted for use with a rope sling or the like.

One object of the invention is the provision of a rope hook having novel means whereby the hook is secured to a rope or sling without knotting, and is easily and quickly detached therefrom.

Another object of my invention is to provide a hook to which the sling may be secured without crossing upon itself, so as to avoid and prevent cutting or wearing of the rope.

Another object of the invention is to provide a rope hook adapted to positively engage and remain in holding engagement with a sling when a load on the rope hook and sling is slackened.

A further object of the invention is to provide a rope hook which is adapted for use on tow lines for engaging slings in rigging, in hitching, and various other uses.

A still further object of my invention is to provide a rope hook adapted to use with either hemp or wire ropes and slings made of these materials.

Other objects will be made apparent in reading the specification and inspecting the accompanying drawings, in which—

Figure 1 is a plan showing rope hooks embodying my invention secured to the ends of a tow line or cable, in accordance with the invention.

Fig. 2 is a perspective view showing details in the construction of the hooks of Fig. 1.

Fig. 3 is a plan showing my improved rope hook and showing ends of a detachable rope sling in partial engagement therewith.

Fig. 4 is a plan similar to Fig. 3, showing the ends of the rope sling in holding engagement with the rope hook.

Fig. 5 is a side elevation of the rope hook of Figs. 3 and 4.

Referring now to the drawings, the numeral 2 designates the shank of a rope hook made in accordance with my invention, having an eye 3 formed in its upper end. Integral curved lugs or horns 4 and 5 extend outwardly from opposite sides of the shank 2 at approximately the middle of its length. The ears 4 and 5 have a rounded cross section, and the ends 6 of the horns are spaced from the shank 2 of the hook to form an opening which preferably is of such width that the end of a rope sling must be forced through such opening. In such case, as the width thereof is slightly less than the diameter of the rope, the rope will be prevented from being accidentally disengaged from the hooks during its use.

An elongated eye 7 is provided on the other end or base of the shank 2, this eye being of a length and width that will accommodate both ends of the sling by which the hooks 4 and 5 are detachably fastened to the article or object to be lifted or hauled.

As is shown in Fig. 1, my improved hooks are applied to the ends of a wire rope or cable forming a tow line 8, a hemp sling 9 (Figs. 3, 4, and 5) being used to fasten the hooks to another object. The ends of the line 8 pass through the eyes 3 of the hooks and are lashed or spliced to form an eye on the ends of the line. These eyes engage with the eyes 3 of the hooks and permanently secure the hooks on the end of the tow line 8. The endless sling 9 may be made of any desired material, but preferably will be made of hemp.

The endless sling 9 is adapted for use by passing it around the article being towed or lifted, and to be doubled upon itself so as to form the loop portions 11 and 12 which are passed through the elongated eye 7 as shown in Fig. 3, and to be engaged by the horns 4 and 5, respectively, as shown in Fig. 4 so as to quickly and securely fasten the ends of the tow line to other objects or articles.

It will be understood that various changes in construction and composition of the materials forming my improved rope hook may be made, without departing from the spirit of my invention as defined in the appended claims.

I claim:—

1. A rope hook comprising a shank having horns extending from opposite sides thereof and having an eye at each end of said shank.

2. A rope hook comprising a shank having horns extending from opposite sides thereof, the ends of said shank having eyes therein, and one of said eyes being of rectangular outline.

3. A rope hook comprising a shank having horns extending from opposite sides thereof, the ends of said shank having eyes therein, and one of said eyes being of rectangular outline and extending outwardly at right angles to said shank.

4. A rope hook comprising a shank, horns extending outwardly from opposite sides of said shank, said shank having eyes in the ends thereof and the eye in one end being of rectangular contour and extending at right angles to the said shank.

In witness whereof I have hereunto signed my name.

OTHO L. GIFFIN.